(12) United States Patent
Hotelling

(10) Patent No.: US 7,049,575 B2
(45) Date of Patent: May 23, 2006

(54) SYSTEM FOR SENSING AMBIENT LIGHT HAVING AMBIENT STABILITY PROBABILITY

(75) Inventor: Steve Hotelling, San Jose, CA (US)

(73) Assignee: Apple Computer Inc., Cupertino, CA (US)

( * ) Notice: Subject to any disclaimer, the term of this patent is extended or adjusted under 35 U.S.C. 154(b) by 245 days.

(21) Appl. No.: 10/659,215

(22) Filed: Sep. 9, 2003

(65) Prior Publication Data

US 2005/0051708 A1    Mar. 10, 2005

(51) Int. Cl.
*H01J 40/14*    (2006.01)

(52) U.S. Cl. .............................. 250/214 AL; 250/214 C

(58) Field of Classification Search ...................... None
See application file for complete search history.

(56) References Cited

U.S. PATENT DOCUMENTS

| | | | |
|---|---|---|---|
| 4,329,581 A | 5/1982 | Helfrich, Jr. et al. | |
| 4,386,345 A | 5/1983 | Narveson et al. | |
| 4,589,022 A | 5/1986 | Prince et al. | |
| 4,904,998 A | 2/1990 | Niimi | |
| 4,937,443 A | 6/1990 | Smoot | |
| 4,968,127 A | 11/1990 | Russell et al. | |
| 5,270,818 A | 12/1993 | Ottenstein | |
| 5,406,305 A | 4/1995 | Shimomura et al. | |
| 5,469,296 A | 11/1995 | Ohno et al. | |
| 5,554,912 A | 9/1996 | Thayer et al. | |
| 5,666,028 A | 9/1997 | Bechtel et al. | |
| 5,971,597 A | 10/1999 | Baldwin et al. | |
| 5,973,594 A | 10/1999 | Baldwin et al. | |
| 6,069,597 A | 5/2000 | Hansen | |
| 6,069,598 A | 5/2000 | Hansen | |
| 6,094,185 A | 7/2000 | Shirriff | |
| 6,144,359 A | 11/2000 | Grave | |
| 6,191,531 B1 | 2/2001 | Reime | |
| 6,255,784 B1 * | 7/2001 | Weindorf | ..................... 315/291 |
| 6,288,492 B1 | 9/2001 | Wolfe | |
| 6,291,905 B1 | 9/2001 | Drummond et al. | |
| 6,324,008 B1 | 11/2001 | Baldwin et al. | |
| 6,337,675 B1 | 1/2002 | Toffolo et al. | |
| 6,396,040 B1 | 5/2002 | Hill | |
| 6,402,328 B1 | 6/2002 | Bechtel et al. | |
| 6,507,286 B1 | 1/2003 | Weindorf et al. | |
| 6,526,688 B1 | 3/2003 | Danielson et al. | |
| 6,578,311 B1 | 6/2003 | Danielson et al. | |

* cited by examiner

*Primary Examiner*—Que T. Le
(74) *Attorney, Agent, or Firm*—Buchanan Ingersoll PC

(57) ABSTRACT

A system and method for sensing ambient light. The system has a first sensor for measuring a first ambient light level and a second sensor for measuring a second ambient light level. A processor in communication with the first sensor and the second sensor is configured to determine a relative intensity change in the ambient light levels for each of the first and second sensors. The processor also determines an ambient stability probability in response to the relative intensity changes in order to generate first and second filtered ambient light levels which are used as ambient light measurements.

29 Claims, 7 Drawing Sheets

SYSTEM FOR SENSING AMBIENT LIGHT HAVING AMBIENT STABILITY PROBABILITY

FIELD OF THE INVENTION

The present invention relates generally to sensing an ambient light level and more particularly to a system for precisely determining changes in the level of ambient light with multiple sensors.

DESCRIPTION OF THE RELATED ART

On many laptop computers, the brightness of the display is automatically adjusted according to the ambient light. A sensor detects the level of ambient light to determine the brightness of a display backlight. In this regard, in a bright environment, the brightness of the display backlight is increased in order to view the display easier. Similarly, in a dark environment, the brightness of the display backlight is reduced so that the display is not too bright for the user. Furthermore, the level of the ambient light detected by the sensor can be used to adjust the brightness of a keyboard illumination source which lights the keyboard. In dark environments the brightness of the keyboard illumination source is increased in order to view the keys easier.

Two sensors can be used to detect the ambient light level in order to reduce the possibility of a hand shadowing one of the sensors. If only one sensor is used and a shadow crosses the sensor, then the resulting ambient light measurement from the single sensor will not be the true ambient light level.

Referring to FIG. 1, a computer 10 has a left sensor 12 and a right sensor 14 disposed near the keyboard of the computer 10 for measuring the ambient light levels. However, due to the location of the sensors 12, 14, it is still possible that ambient light received by the sensors 12, 14 will become blocked by the hands of the user while typing on the keyboard of the laptop 10.

In order to determine whether light is blocking either one or both of the sensors 12, 14, the computer 10 monitors both signals. Referring to FIG. 2, a flowchart showing the prior art process of measuring ambient light levels from the two sensors 12, 14 is shown. In step 100, measurements from the left sensor 12 of the laptop computer 10 are digitally sampled. Typically, about six samples are taken in quick succession. In step 102, the high and low samples from the left sensor 12 are discarded, and in step 104 the remaining samples are averaged to determine an average ambient light level.

In step 106, the value of the average ambient light level is compared to a previous average value that has been determined for the left sensor 12 in a previous cycle. Specifically, the percentage difference between the new average measurement and the previous measurement is found. If the new average ambient light measurement is at least +/−5% from the previously found measurement, then a notification is posted in step 108.

The same process for measuring the ambient light level for the left sensor 12 is also performed for the right sensor 14. Specifically, in step 110, six measurements of the ambient light from the right sensor 14 are digitally sampled. In step 112, the high and low samples are discarded, while in step 114, the average of the samples is computed. In step 116, the average value of the samples is compared to the average value previously found for the right sensor 14. In step 118, a notification is posted if the new average ambient light measurement is at least +/−5% from the previously found measurement for the right sensor 14.

If a notification has been posted in either step 118 or 108, then the brightness of the display backlight and/or the keyboard illumination source is adjusted. In step 120, the brightness of the backlight and/or keyboard illumination sources is adjusted according to the highest measurement value from either the left or right sensors 12, 14.

Referring to FIG. 3, the signals generated by the left and right sensors 12 and 14 are shown. A left sensor signal 16 and a right sensor signal 18 are generated by respective left and right sensors 12, 14. Typically, the level of the signals 16, 18 generated by the sensors 12, 14 will not be the same value due to variations of the ambient light detected. At time "A", the ambient light of the environment where the sensors are placed decreases. Accordingly, both of the sensor signals 16, 18 decrease at time "A". An output adjustment signal 20, is the higher value of the left and right signals 16, 18 and is used to adjust the brightness of the display backlight or the keyboard illumination source. Once the ambient light increases at time "B", then both the signals 16, 18 increase, as well as adjustment signal 20.

The example shown in FIG. 3 illustrates the case where the ambient light changes quickly for both sensors 12, 14 such as when the lights in a room are turned off. The rapid response of the adjustment signal 20 in this situation is desirable so that the brightness of the display is correct. When the lights in the room are turned back on, the brightness of the display is adjusted accordingly.

An example where a shadow blocks the ambient light to only one of the sensors is shown in FIG. 4. At time "A'" in FIG. 4, the ambient light to the left sensor 12 is blocked. As can be seen, the signal 16 from the left sensor 12 decreases rapidly. However, the signal 18 from the right sensor 14 remains constant. At time "B", the shadow over the left sensor 12 is removed and the signal 16 rapidly increases.

As previously discussed, the adjustment signal 20 is based on the higher of the signals from the left and right sensors 12 and 14. As seen in FIG. 4, the adjustment signal 20 decreases sharply at time "A" to the value of the right signal 18. Similarly, the adjustment signal 20 increases sharply to the value of the of the left signal 16 at time "B". The sharp increase and decrease in the adjustment signal can cause the brightness of the display to increase or decrease rapidly. The adjustment of the brightness is not really necessary because the ambient light level has not changed. However, if there is a difference in ambient light level measurements between the left sensor 12 and the right sensor 14, and the ambient light to one of the sensors is blocked, the display brightness will change rapidly as it adjusts to the higher of the two signals 16, 18. This rapid adjustment can be annoying to the user of the computer 10.

SUMMARY OF THE INVENTION

There is needed a method of filtering out the effects of shadows in order to adjust the brightness of the display accurately. Specifically, the rate at which the brightness of the display backlight and keyboard illumination should be varied depending upon whether a shadow is crossing over the sensors or the ambient light is actually changing.

In accordance with the present invention, there is provided a system for measuring ambient light levels. The system has a first sensor for measuring a first ambient light level and a second sensor for measuring a second ambient light level. A processor in communication with the first and second sensors is configured to determine a relative intensity change in the ambient light levels for both the first and second sensors. The processor determines an ambient stability probability using the relative intensity changes in order to calculate first and second filtered ambient light levels that may be used to adjust the brightness of a keyboard illumination source, or the brightness of the display, or any other light related control.

The brightness is adjusted according to the higher of the first and second filtered ambient light levels. The relative intensity change is found by comparing the value of the ambient light level to a previous ambient light level for each of the sensors. The ambient stability probability is found by using the relative intensity change for each of the first and second sensors as input to a lookup table that gives the probability that the ambient light level is stable.

In accordance with the present invention, there is provided a method of determining an ambient light level with a first and second sensor. A first ambient light level is determined with the first sensor. Next, a first relative intensity change is computed for the first ambient light level. A second ambient light level and a second relative intensity change for the second ambient light level is computed. A probability of a change in the ambient light levels is determined in response to the first relative intensity change and the second relative intensity change. The measured first and second ambient light levels are then adjusted in response to the probability of a localized change in order to generate first and second filtered ambient light levels. The rate of adjustment is proportional to the probability of a change in the ambient light levels.

BRIEF DESCRIPTION OF THE DRAWING FIGURES

These, as well as other features of the present invention, will become more apparent upon reference to the drawings wherein.

DETAILED DESCRIPTION OF THE INVENTION

Figure 1:
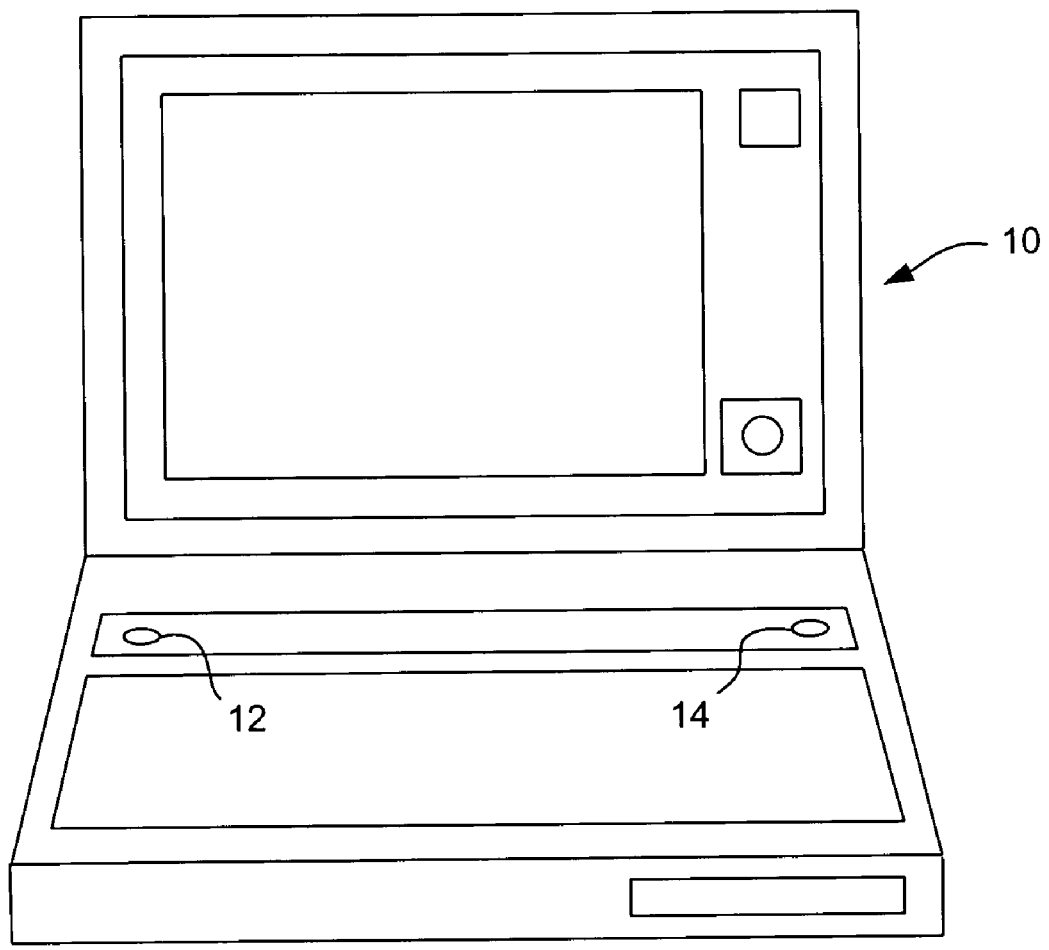
FIG. 1 illustrates a laptop computer having light sensors disposed near the keyboard.
Figure 2:
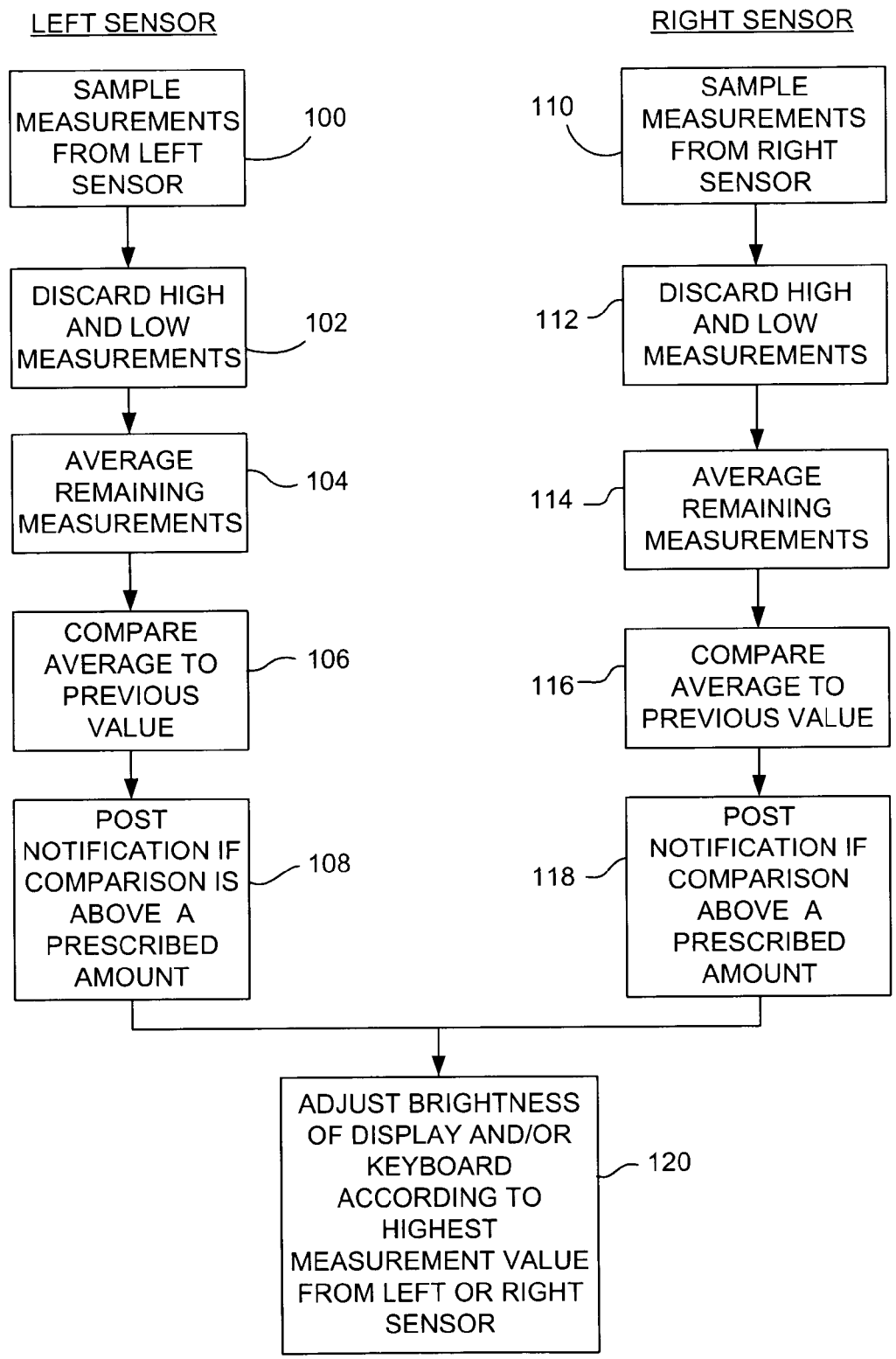
FIG. 2 is a flowchart illustrating a prior art method of determining ambient light levels with the sensors shown in FIG. 1 and adjusting the brightness of a display and/or keyboard illumination source.
Figure 3:
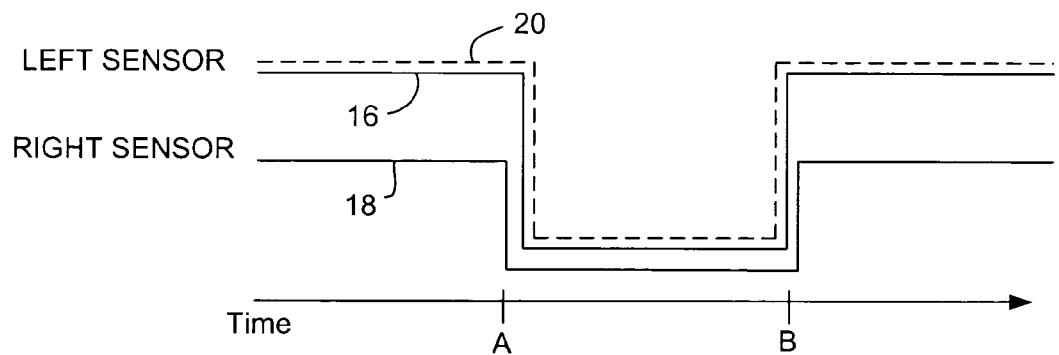
FIG. 3 illustrates the signals generated by the sensors for a change in the ambient light level using the method shown in FIG. 2.
Figure 4:
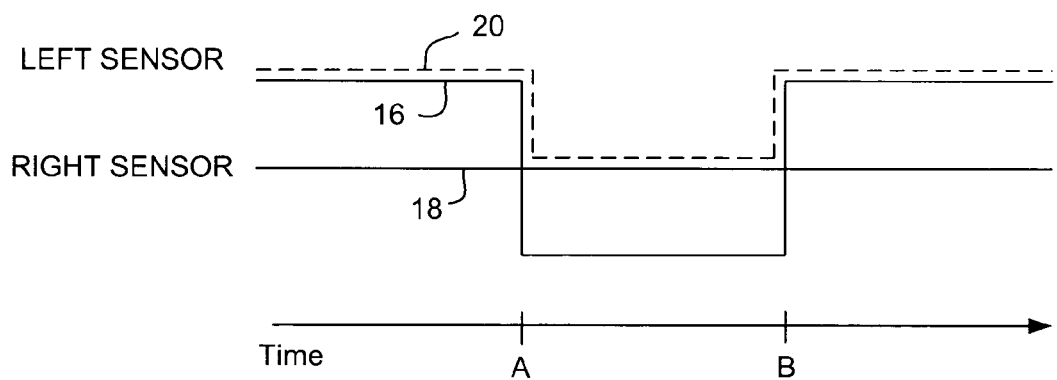
FIG. 4 illustrates the signals generated by the sensors for a shadowing event using the method shown in FIG. 2.
Figure 5:
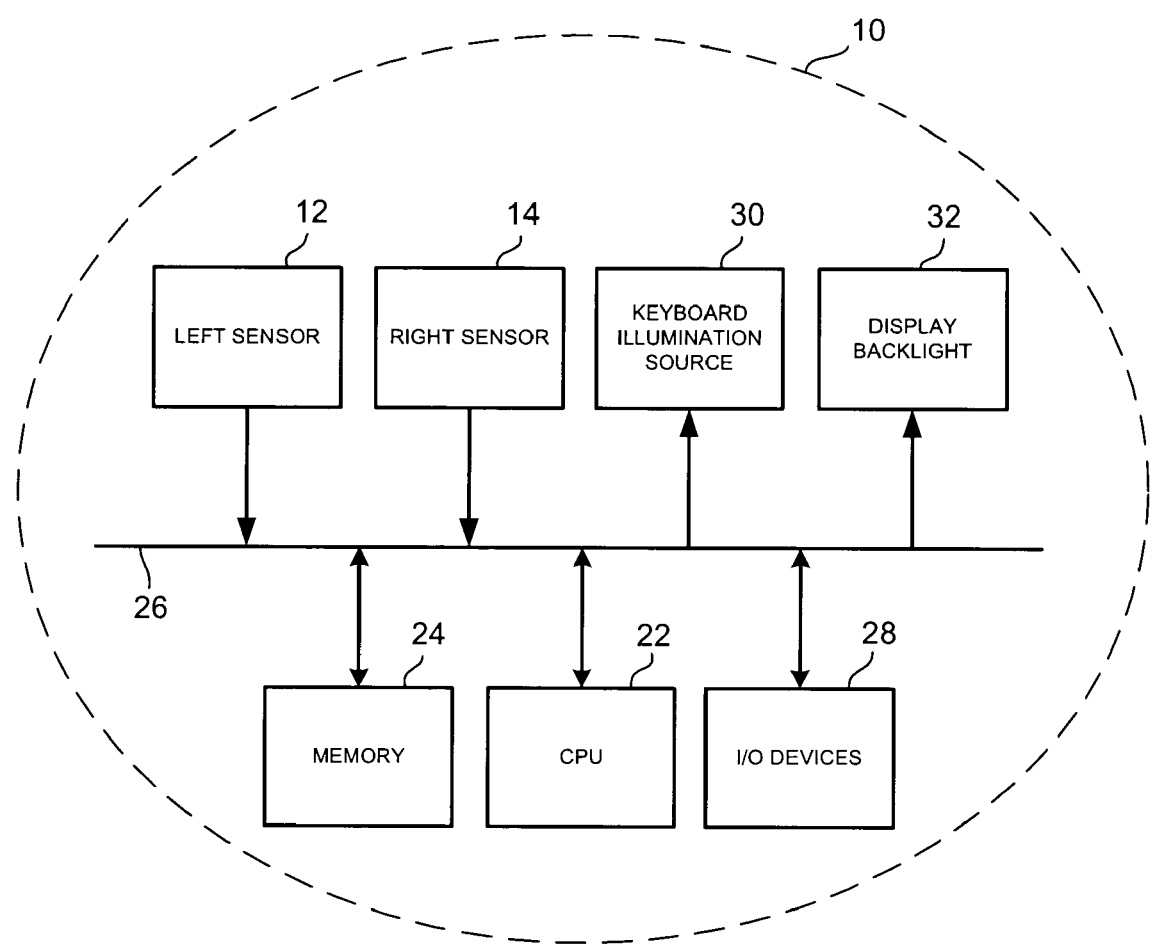
FIG. 5 is a conceptual block diagram for the computer shown in FIG. 1.

Referring now to the drawings wherein the showings are for purposes of illustrating a preferred embodiment of the present invention only, and not for purposes of limiting the same, FIG. 5 is a conceptual block diagram for the computer 10 shown in FIG. 1. The computer 10 has a central processing unit (CPU) 22, memory 24 (e.g., RAM, ROM, hard disk, etc . . . ) and I/O devices 28 (e.g., keyboard, mouse, etc . . . ) connected through a bus 26. Also connected to the bus 26 are the left and right sensors 12, 14, as well as a keyboard illumination source 30 and a display backlight 32. The keyboard illumination source generates light under the keyboard of the laptop computer 10 so that the keyboard is easier to see in low light situations. The display backlight 32 provides illumination to the display of the computer 10. Even though the present invention is being described as providing ambient light levels for use by laptop computer 10, it will be recognized by those of ordinary skill in the art that the present invention can also be adaptable to other devices, or to other light-related controls of such devices. For example, the method of sensing ambient light of the present invention can also be used to adjust the brightness of other devices such as televisions, lights, handheld devices, etc., or could be used to control enclosure, lighting, video conferencing camera sensitivity, music volume etc. Further, although the system components in FIG. 5 are illustrated as being connected to a single bus, the invention is not limited to any particular architecture.

The CPU 22 executes instructions stored on memory 24 in order to control the brightness of the display backlight 32 and the keyboard illumination source 30. The left and right sensors 12, 14 generate ambient light level signals which are processed by the CPU 22 in order to control the brightness of the keyboard illumination source 30 and the display backlight 32.

Figure 6:
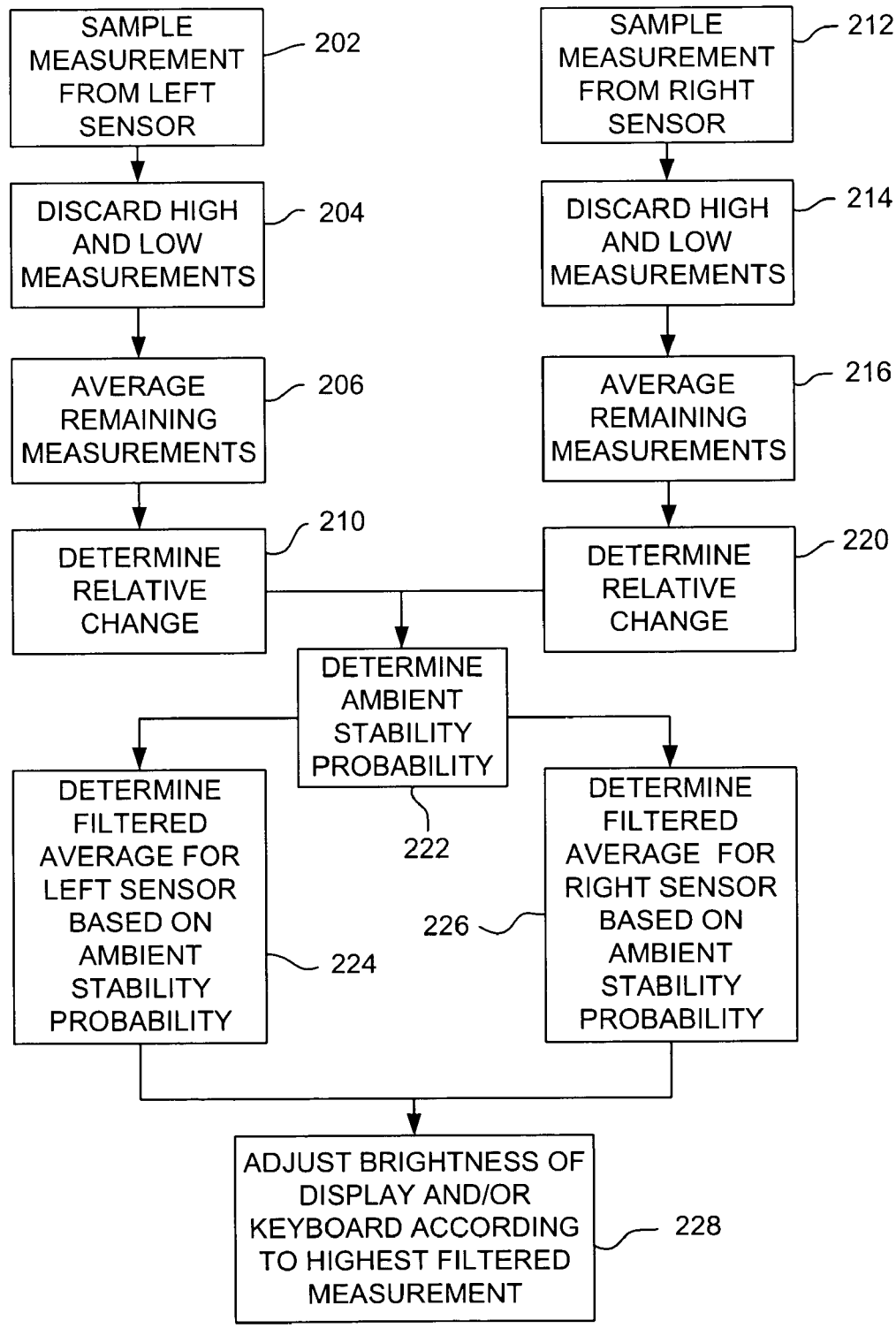
FIG. 6 is a flowchart illustrating a method of determining ambient light levels according the present invention.

Referring to FIG. 6, the method for adjusting the brightness of the display backlight 32 and keyboard illumination source 30 of the present invention is shown. In step 202, the ambient light measurement from the left sensor 12 is digitally sampled. At a suitable sampling frequency such as every 100 ms, a single (10 bit+gain setting) analog-to-digital (A/D) sample is taken from the left sensor 12. After five samples have been taken (e.g., after 500 ms), in step 204 the high and low measurements of the samples are discarded, thereby leaving three samples. In step 206, the remaining three samples are averaged to determine an averaged ambient light level for the left sensor 12. Typically, the value of the measurement from the left sensor 12 ranges from 0 to 2500.

In step 210, the relative intensity change for the averaged ambient light level is determined every 200 ms. Specifically, the relative intensity change is calculated as a percentage difference according the following formula:

$$\text{Relative Intensity Change (\%)} = (\text{Reading} - \text{Filtered}) / \text{Filtered} \quad (1)$$

wherein:

Reading=current averaged ambient light level found in step 206; and

Filtered=previous filtered ambient light level from step 224 of the previous processing cycle, as will be further explained.

While the measurements from the left sensor 12 are being processed, the measurements from the right sensor 14 are also being processed. Every 100 ms, a single (10 bit+gain setting) A/D sample from the right sensor 14 is taken in step 212. After five samples have been taken, then the high and low measurements are discarded in step 214. The remaining three samples are averaged in step 216 to generate an averaged ambient light level for the right sensor 14. Typically, the value of the measurement from the right sensor 14 ranges from 0 to 2500.

In step 220, the relative intensity change for the averaged ambient light level is determined every 200 ms for the right sensor 14. The relative intensity change is calculated according to equation (1). Specifically, the current averaged ambient light level and the previous filtered ambient light level (from step 226 of the previous cycle) for the right sensor 14 are used in equation (1) to determine the relative intensity change.

Once both relative intensity changes for the averaged ambient light levels have been found in steps 210 and 220, the ambient stability probability is determined in step 222. For example, if the ambient light level from one of the sensors 12, 14 remains constant while the other changes, then there is a high probability that the ambient light level is stable and that a shadowing or blinding (i.e, bright light flash) event has occurred. During this type of event, the brightness of the keyboard illumination source 30 and the display backlight 32 should not be changed rapidly because in all likelihood the actual level of the ambient light is not changing.

On the other hand if the ambient light level from both sensors 12, 14 changes significantly, then there is a high probability that the ambient light level for the environment is actually changing. In this instance, the brightness of the keyboard illumination source 30 and the display backlight 32 should change rapidly because in all likelihood the actual level of the ambient light is changing.

In an embodiment of the invention, a lookup table is used to determine the probability that the ambient light is stable. One example of a lookup table for the ambient stability probability is shown in TABLE I. The relative intensity change found in step 210 for the left sensor 12 is used to select the rows of TABLE I. Similarly, the relative intensity change found in step 220 for the right sensor 14 is used to select the columns of TABLE I. The intersection between the selected column and row in TABLE I determines the ambient stability probability. A single ambient stability probability is obtained and applied to the ambient light signals of both the left and right sensors 12, 14.

TABLE I

|  | Right: Less than −30% | Right: −30% to −5% | Right: −4% to +4% | Right: +5% to +30% | Right: More than +30% |
|---|---|---|---|---|---|
| Left: Less than −30% | 0% | 20% | 90% | 20% | 0% |
| Left: −30% to −5% | 20% | 50% | 90% | 50% | 20% |
| Left: −4% to +4% | 90% | 90% | 95% | 90% | 90% |
| Left: +5% to +30% | 20% | 50% | 90% | 50% | 20% |
| Left: More than +30% | 0% | 20% | 90% | 20% | 0% |

After the correct ambient stability probability is located in Table I, then a filtered averaged ambient light level for the left sensor 12 is determined in step 224. Similarly, a filtered averaged ambient light level for the right sensor 14 is determined in step 226. The ambient stability probability found in step 222 is used to determine the filtering algorithm to use from Table II. As the probability of the ambient light level being steady increases, then the responsiveness of the display backlight 32 and keyboard illumination source 30 should decrease. Using the ambient stability probability, the amount of adjustment to be applied to the current ambient light level from the sensors 12, 14 can be found. The amount of adjustment is equal to a previous filtered ambient light level found in step 224 for the left sensor 12 and step 226 for the right sensor multiplied by a factor responsive to the ambient stability probability. For example, as the ambient stability probability increases, the factor decreases, thereby lowering the amount of adjustment.

TABLE II

| Ambient Stability Probability (from Table I) | Filtering Algorithm |
|---|---|
| 0% | Filtered = Reading |
| 20% | Adjustment = 0.02 × Filtered |
| 50% | Adjustment = 0.01 × Filtered |
| 90% | Adjustment = 0.004 × Filtered |
| 95% | Adjustment = 0.002 × Filtered |

The filtered average measurement is determined every 200 ms for both the left and right sensors 12, 14 in steps 224, 226 respectively. Specifically, Table II determines the amount of adjustment to be applied to the measurements from the sensors 12, 14. For example, if the ambient stability probability is 0%, then the filtered reading is equal to the actual reading from the light sensor such that a fast response for the display backlight 32 and keyboard illumination source 30 is achieved. However, if the ambient stability probability is high (i.e., around 90%–95%), then the filtered reading will be the current measurement minus a portion of the previous reading. In other words, for high ambient stability probabilities, the rate of change between measurements is filtered to be slowed down. It will be apparent that the invention is not limited to a calculation of a probability per se, but other measures of lighting stability over time may likewise be used to practice the invention.

If the amount of adjustment determined from Table II is less than one, then the adjustment is set to be equal to one for ease in processing. Specifically, in low light situations where the measurements from the sensors 12, 14 are low, then the adjustment value will also be very low. In order to simplify the determination of the filtered averaged measurement, it is possible to set the adjustment to one because any value less than one is imperceptible to the user.

Once the amount of the adjustment has been calculated, it is applied to the averaged measurement. Specifically, for each left and right sensor 12, 14, if the averaged measurement is less than the previous filtered measurement, then the new filtered measurement is equal to the previous filtered measurement minus the adjustment. The filtered measurement will decrease at a rate in proportion to the ambient stability probability.

In the case where the averaged measurement is greater than the previous filtered measurement, then the new filtered measurement is equal to the previous filtered measurement plus the adjustment. The filtered measurement will increase at a rate in proportion to the ambient stability probability.

Once the filtered measurements are determined for both of the left and right sensors 12, 14, the values are used to adjust the brightness of the display backlight 32 and the keyboard illumination source 30 every 200 ms in step 228. Specifically, the highest value between the filtered measurements from the left and right sensors 12, 14 are used to determine the brightness of the keyboard illumination source 30 and the display backlight 32. Alternatively, it is possible to only adjust the brightness of the keyboard illumination source 30 and the display backlight 32 when the new filtered measurement varies by a prescribed amount from a previous value (e.g., more than 1%).

Figure 7:
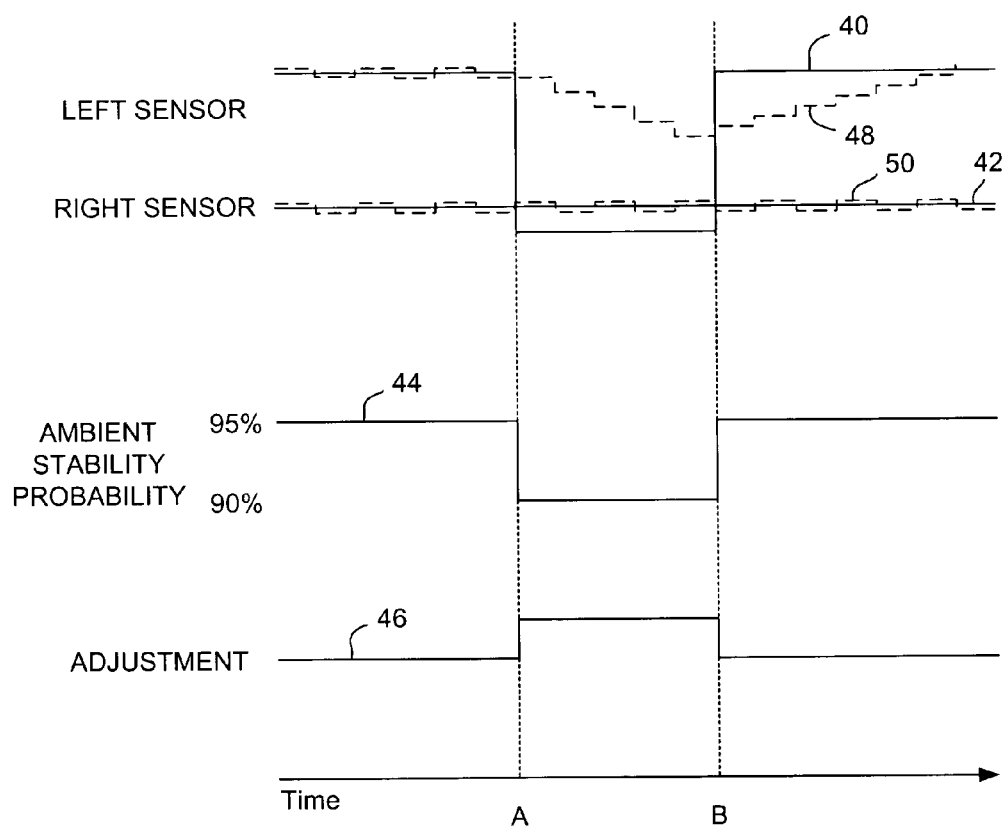
FIG. 7 illustrates the signals generated by the sensors for a shadowing event using the method of the present invention.

Referring to FIG. 7, an example of the signals from the left and right sensors 12, 14, as well as the filtered measurements, is shown for the situation where a shadowing event occurs over the left sensor 12. In this example, the left sensor 12 generates a left measurement signal 40 that is temporarily blocked at time "A". Accordingly, the left measurement signal decreases in value quickly. However, a right measurement signal 42 from the right sensor 14 does not decrease because the ambient light to the right sensor 14 is not blocked. The ambient stability probability signal 44 is at 95% before time "A" because neither the left or right measurement signals 40, 42 are changing. However, once the light to the left sensor 12 is blocked, then the stability probability signal 44 drops to 90%. As previously mentioned, the ambient stability probability is determined by finding the relative intensity change for the left and right measurement signals 40, 42 and using Table I.

With the ambient stability probability being 90%, then the adjustment 46 to be applied to the left measurement signal 40 is relatively low. Specifically, using Table II, the adjustment is equal to 0.004 of the previous filtered reading. The adjustment is subtracted from the previous filtered reading in order to determine a new filtered reading. As seen in FIG. 7, the filtered reading 48 for the left signal 40 decreases slowly after time "A".

At time "B", the shadowing event is removed from the left sensor 12, such that the left measurement signal 40 increases above the filtered measurement signal 48. At this time, the ambient stability probability signal 44 returns to 95% and the filtered measurement signal 48 will slowly increase. Furthermore, at time "B, the adjustment signal 46 decreases.

The right measurement signal 42 never sharply decreases during the shadowing event between time "A" and "B". Accordingly, the right filtered measurement signal 50 oscillates around the right measurement signal 42. The oscillation is caused because a small adjustment is always being applied according to the adjustment found in TABLE II. However, because the right measurement signal 42 is steady, the oscillations of the right filtered measurement signal 42 will also be steady.

The brightness of the keyboard illumination source 30 and display backlight 32 is determined from the higher of the two filtered measurement signals 48, 50. Accordingly, for the example shown in FIG. 7, the left filtered measurement signal 48 is used to control the brightness. The left filtered measurement signal 48 slowly decreases and increases such that any change in the brightness of the keyboard illumination source 30 and the display backlight 32 in response thereto is imperceptible to the user because the rate of change is slow.

Figure 8:
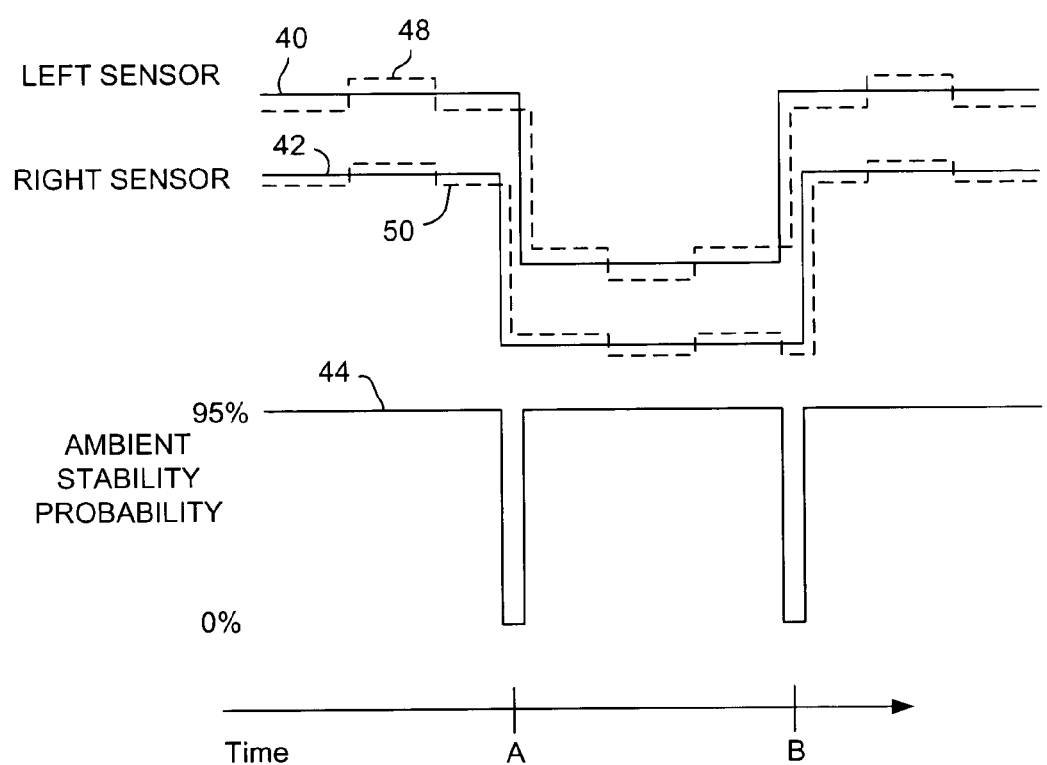
FIG. 8 illustrates the signals generated by the sensors for a change in the ambient light level using the method of the present invention.

Referring to FIG. 8, an example where the ambient light to both the left and right sensors 12, 14 is blocked is shown. In this example, both the left measurement signal 40 and the right measurement signal 42 decrease sharply at time "A". The ambient stability probability decreases from 95% to 0%. As seen from Table II, when the probability is 0%, then the filtered measurement is equal to the current averaged measurement such that both the filtered measurement signals 48, 50 will rapidly decrease to the value of respective left and right measurement signals 40, 42. After the left and right measurement signals 48, 50 decrease, the signals 48, 50 remain steady, thereby increasing the ambient stability probability to 95%. Because both ambient light sensors 12, 14 return to a previous value at time "B", the filtered measurement signals 48, 50 also rapidly return to the same value. Accordingly, as seen by FIG. 8, both filtered measurement signals 48, 50 rapidly adjust to the change in ambient lighting conditions. As both the filtered measurement signals 48, 50 increase and decrease rapidly, the brightness of the display backlight 32 and keyboard illumination source 30 rapidly change in response to the changes in the ambient light levels.

Additional modifications and improvements of the present invention may also be apparent to those of ordinary skill in the art. Thus, the particular form of the invention described and illustrated herein is not intended to serve as limitations of alternative forms within the spirit and scope of the invention.

What is claimed is:

1. A system for sensing ambient light, comprising:
   a first sensor for measuring a first ambient light level;
   a second sensor for measuring a second ambient light level; and
   a processor receiving the first ambient light level and the second ambient light level, the processor being configured to determine a relative intensity change in the measured ambient light levels for each of the first and second sensors and determine ambient light stability in response to the relative intensity change in order to generate filtered first and second ambient light levels.

2. The system of claim 1 further comprising an illumination source being configured to adjust the brightness thereof in response to one of the first and second filtered ambient light levels.

3. The system of claim 2 wherein the brightness is adjusted in response to the greater of the first and second filtered ambient light levels.

4. The system of claim 2 wherein the rate of adjustment of the brightness is proportional to the ambient light stability.

5. The system of claim 1 wherein the processor is configured to determine the relative intensity change for each of the first and second sensors by comparing the ambient light level and a previous ambient light level for each one of the sensors.

6. The system of claim 1 wherein the processor is configured to determine the ambient light stability by using the relative intensity change for each of the first and second sensors as input to a lookup table.

7. The system of claim 6 wherein the output of the lookup table is the probability that the ambient light level is stable for the first and second sensors.

8. A method of determining an ambient light level with a first and second sensor, the method comprising the following steps:
   determining a first ambient light level using the first sensor at a plurality of times;
   computing a first relative intensity change for the first ambient light level;
   determining a second ambient light level using the second sensor at a plurality of times;
   computing a second relative intensity change for the second ambient light level;
   determining an ambient light stability factor in response to the first relative intensity change and the second relative intensity change; and
   using the ambient light stability factor to detect the change in the ambient light level.

9. The method of claim 8 including the further step of adjusting a light-related control in accordance with the detected change in light level.

10. The method of claim 8 further comprising:
adjusting the first ambient light level in response to the ambient light stability factor to generate a first filtered ambient light level; and
adjusting the second ambient light level in response to the ambient light stability factor to generate a second filtered ambient light level.

11. The method of claim 10 further comprising the step of adjusting an illumination source in response to one of the first filtered ambient light level and the second filtered ambient light level.

12. The method of claim 11 wherein the illumination source is adjusted in response to the greater of the first filtered ambient light level and the second filtered ambient light level.

13. The method of claim 9 wherein the rate of adjustment of the light-related control is proportional to the ambient light stability factor.

14. The method of claim 8 wherein the step of computing a relative intensity change for each of the first and second ambient light levels is performed by finding the difference between a previous ambient light level and the ambient light level for each of the first and second sensors.

15. The method of claim 8 wherein the step of determining the ambient light stability factor is performed by using the relative intensity change for both the first and second sensors as inputs to a lookup table.

16. The method of claim 15 wherein the output of the lookup table is the probability that the ambient light level is stable.

17. The method of claim 10 wherein the steps of adjusting the first and second ambient light levels in response to the ambient light stability factor is performed by adjusting a previous ambient light level by a factor proportional to the ambient stability probability.

18. The method of claim 17 further comprising the step of adjusting the brightness of an illumination source in response to the greater of the filtered first and second ambient light levels.

19. A computer-readable medium containing a program having instructions which execute the following procedure:
computing a first relative intensity change for a first ambient light level from a first sensor;
computing a second relative intensity change for a second ambient light level from a second sensor;
determining an ambient stability probability from the first relative intensity change and the second relative intensity change;
adjusting the first ambient light level in response to the ambient stability probability to generate a first filtered ambient light level; and
adjusting the second ambient light level in response to the ambient stability probability to generate a second filtered ambient light level.

20. The computer-readable medium of claim 19 wherein the program further includes instructions for adjusting an illumination source in response to the greater of the first filtered ambient light level and the second ambient light level.

21. The computer-readable medium of claim 19 wherein the program further includes instructions for computing the relative intensity change for each of the first and second ambient light levels by finding a difference between a previous ambient light level and the ambient light level for each of the first and second sensors.

22. The computer-readable medium of claim 19 wherein the program further includes a lookup table for determining the ambient stability probability by using the relative intensity change for both the first and second sensors as inputs to the lookup table.

23. The computer-readable medium of claim 22 wherein the output of the lookup table is the probability that the ambient light level is stable for the first and second sensors.

24. The computer-readable medium of claim 19 wherein the program further includes instructions for adjusting the first and second light levels in response to the ambient stability probability by a factor proportional to the ambient stability probability in order to generate the filtered first and second ambient light levels.

25. A system for sensing ambient light, comprising:
first light sensing means generating a first ambient light signal;
second light sensing means generating a second ambient light signal; and
processing means in communication with the first and second light sensing means, the processing means being configured to generate first and second filtered ambient light signals in response to the probability that at least one of the first and second sensors has experienced a localized ambient light level change.

26. The system of claim 25 wherein the processing means is configured to determine the probability that one of the first and second light sensors has experienced a localized ambient light level change.

27. The system of claim 25 wherein the processing means is configured to determine the probability that at least one of the first and second sensors has experienced a localized ambient light level change by determining a relative intensity change of the ambient light levels for each of the first and second sensors.

28. The system of claim 27 wherein the ambient stability probability is determined by comparing the relative intensity changes of the ambient light level for the first and second sensors.

29. The system of claim 25 wherein the processing means is configured to adjust the brightness of an illumination source in response to the greater of the first and second filtered ambient light signals.

* * * * *